US010531303B2

(12) United States Patent
Buckley et al.

(10) Patent No.: US 10,531,303 B2
(45) Date of Patent: Jan. 7, 2020

(54) DETECTING AND WARNING OF BASE STATIONS WITH A SECURITY RISK (71) Applicant: BlackBerry Limited, Waterloo (CA)

(72) Inventors: Michael Eoin Buckley, Grayslake, IL (US); Shu-Lin Chen, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/131,450

(22) Filed: Apr. 18, 2016

(65) Prior Publication Data
US 2017/0303133 A1  Oct. 19, 2017

(51) Int. Cl.
*H04W 12/12* (2009.01)
*H04L 9/32* (2006.01)
*H04W 48/16* (2009.01)
*H04W 12/08* (2009.01)
*H04L 29/06* (2006.01)
*H04W 12/00* (2009.01)

(52) U.S. Cl.
CPC ........... *H04W 12/12* (2013.01); *H04L 9/3249* (2013.01); *H04L 9/3252* (2013.01); *H04L 9/3268* (2013.01); *H04L 63/302* (2013.01); *H04W 12/08* (2013.01); *H04W 12/00502* (2019.01); *H04W 12/00505* (2019.01); *H04W 48/16* (2013.01)

(58) Field of Classification Search
CPC ..... H04W 12/12; H04W 12/08; H04W 48/16; H04L 9/3252; H04L 9/3268; H04L 9/3249
See application file for complete search history.

(56) References Cited

U.S. PATENT DOCUMENTS

| | | | |
|---|---|---|---|
| 9,241,007 B1* | 1/2016 | Witter | H04L 63/1433 |
| 2007/0153696 A1* | 7/2007 | Choyi | H04L 63/0218 370/235 |
| 2012/0230488 A1* | 9/2012 | De Los Reyes | H04L 63/126 380/247 |
| 2013/0185794 A1* | 7/2013 | Park | H04W 12/12 726/22 |

(Continued)

FOREIGN PATENT DOCUMENTS

| | | |
|---|---|---|
| CN | 104244251 | 12/2014 |
| CN | 104244251 A * | 12/2014 |

OTHER PUBLICATIONS

Partial European Search Report issued in European Application No. 17160944.9 dated Jun. 29, 2017; 11 pages.

(Continued)

*Primary Examiner* — Minjung Kim
(74) *Attorney, Agent, or Firm* — Fish & Richardson P.C.

(57) ABSTRACT

Systems, methods, and software can be used to share content. In some aspect, an electronic device selects a base station to camp on. A first message is sent from the electronic device to the base station. The first message is addressed to a server and requests the server to send a second message to the electronic device. Whether the electronic device receives the second message from the base station within a threshold time period after the first message is sent is determined. The electronic device determines that the base station has a security risk based at least in part on whether the second message is received within the threshold time period.

18 Claims, 2 Drawing Sheets

(56) References Cited

U.S. PATENT DOCUMENTS

| | | | |
|---|---|---|---|
| 2014/0064486 A1* | 3/2014 | Abraham | H04W 12/04 380/270 |
| 2014/0080446 A1 | 3/2014 | Miklos et al. | |
| 2014/0087693 A1* | 3/2014 | Walby | B60R 25/2072 455/411 |
| 2014/0177611 A1* | 6/2014 | Corrales Lopez | H04W 88/08 370/338 |
| 2015/0334566 A1 | 11/2015 | Selander et al. | |
| 2016/0112857 A1* | 4/2016 | Wu | H04W 4/22 455/404.1 |
| 2016/0309332 A1* | 10/2016 | Norrman | H04W 12/12 |
| 2016/0381545 A1* | 12/2016 | Wang | H04W 12/12 455/434 |

OTHER PUBLICATIONS

Extended European Search Report issued in European Application No. 17160944.9 dated Oct. 4, 2017; 10 pages.
Communication Pursuant to Article 94(3) issued in European Application No. 17160944.9 dated Oct. 10, 2018, 8 pages.
Communication under Rule 71(3) EPC issued in European Application No. 17160944.9 dated Mar. 22, 2019, 8 pages.

* cited by examiner

DETECTING AND WARNING OF BASE STATIONS WITH A SECURITY RISK

BACKGROUND

The present disclosure relates to detecting and/or warning of base stations with a security risk. In some cases, electronic devices, including mobile devices may connect to other electronic devices in a network through a base station. In some cases, the base station may provide a wireless access interface to the electronic device. The electronic device may send data or voice packets to the base station and the base station can forward the packets to other nodes in a network. The base station can also receive packets addressed to the electronic device from other nodes in a network and deliver the packets to the electronic device.

DESCRIPTION OF DRAWINGS

Like reference numbers and designations in the various drawings indicate like elements.

DETAILED DESCRIPTION

In some cases, an electronic device may communicate with a base station that has a security risk. Examples of a base station that may have a security risk can include an imposter base station. In some cases, the imposter base station may be set up by an attacker and pretend to be a base station that is part of a network operated by a legitimate network operator. If an electronic device establishes a communication channel with the imposter base station, the imposter base station may monitor voice calls of the electronic device, intercept data packets from the electronic device, or compromise data security of the electronic device. In some cases, the imposter base station may send spam messages, e.g., short message service (SMS) to the electronic device that connects to the imposter base station. In some cases, the imposter base station may be part of a man-in-the-middle attack. For example, the imposter base station may pretend to be a legitimate base station to an electronic device and receive data packets from the electronic device. The imposter base station may also pretend to be the electronic device to other network nodes in a legitimate network. The imposter base station can therefore manipulate data packets received from the electronic device and forward the manipulated data packets to a legitimate network. In some cases, the imposter base station may send its signal at a higher power level than a legitimate base station in the overlap coverage area, and therefore may attract the electronic device to connect to the imposter base station.

In some cases, one or more security features can be implemented on base stations in a legitimate network to prevent electronic devices from connecting to imposter base stations. Examples of the security features can include encryption, authentication, or a combination thereof. An electronic device may be configured to only connect to base stations that implemented these features. The electronic device can use these security features to determine whether the base station is a legitimate base station or an imposter base station. However, in some cases, it may be expensive to require a network operator to implement these security features in all base stations in the operator's network.

In some cases, an imposter base station, can be detected by determining whether a message initiated from a server is received by the electronic device through the base station. In some cases, while the electronic device connects to the imposter base station, the electronic device is not under the coverage of a legitimate network. Therefore, a message initiated from a server and addressed to the electronic device may not be delivered to the electronic device through the imposter base station. Therefore, the imposter base station can be detected based on whether a message initiated from a server to the electronic device is received within a threshold time period. FIGS. 1-4 and associated descriptions provide additional details of these implementations.

Detecting a base station with a security risk using a message transmitted from a server may provide one or more advantages. For example, this approach can be implemented without upgrades to base stations in a network, and therefore may be less expensive. Furthermore, this approach can be implemented using a server and an application on the electronic device. The application can be configured by a network operator, an enterprise, or a combination thereof, and can be pushed onto the electronic device. Therefore, this approach can provide a flexible means for different entities to manage security of the electronic device or even the network. Other advantages will be apparent to those of ordinary skill in the art.

Figure 1:
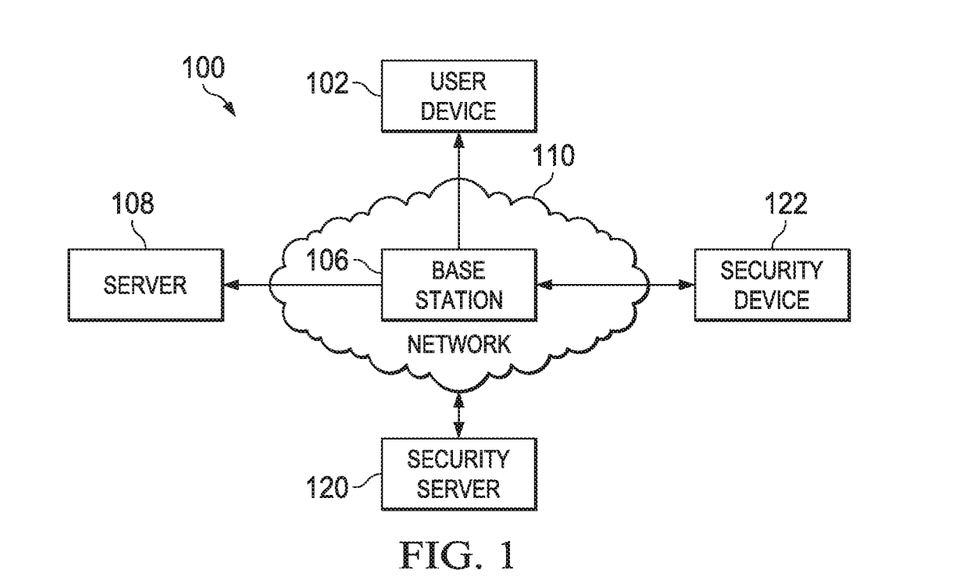
FIG. 1 is an example communication system that detects base stations with a security risk according to an implementation.

FIG. 1 is an example communication system 100 that detects base stations with a security risk according to an implementation. At a high level, the example communication system 100 includes a user device 102 that is communicably coupled with a base station 106. The example communication system 100 also includes a security server 120, a server 108, and a security device 122 that are connected to a network 110.

Figure 2:
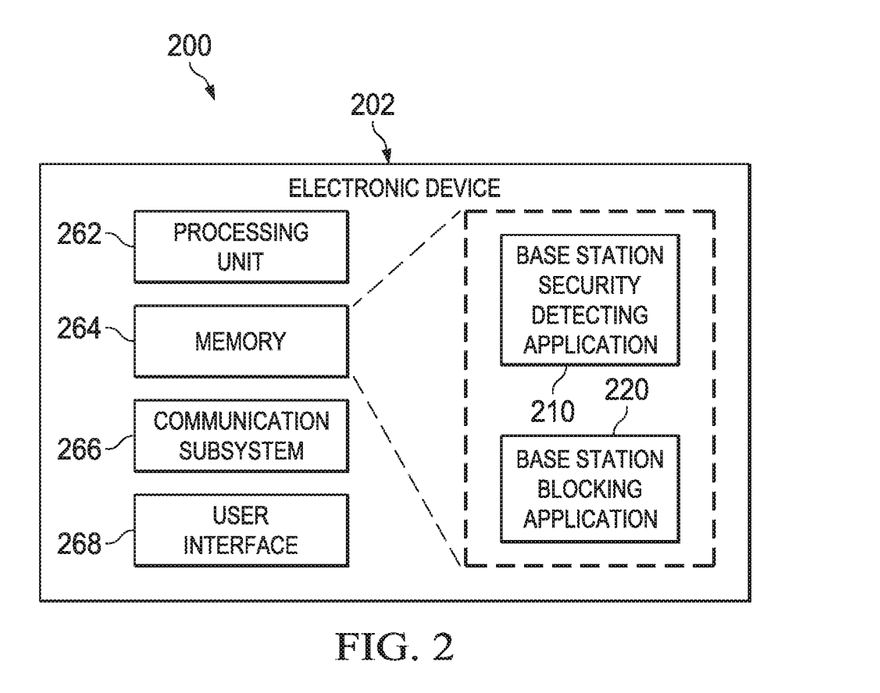
FIG. 2 is a schematic diagram showing an electronic device that detects base stations with a security risk according to an implementation.
Figure 3:
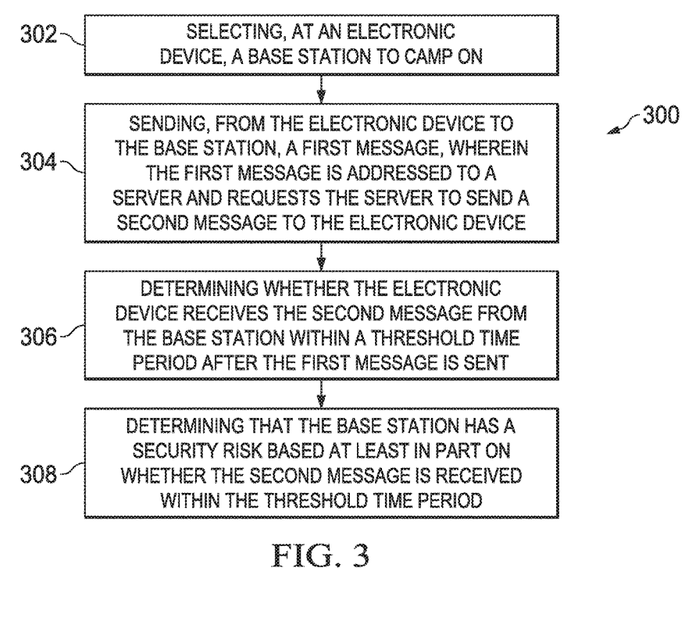
FIG. 3 is a flow diagram showing an example process for detecting base stations with a security risk according to an implementation.
Figure 4:
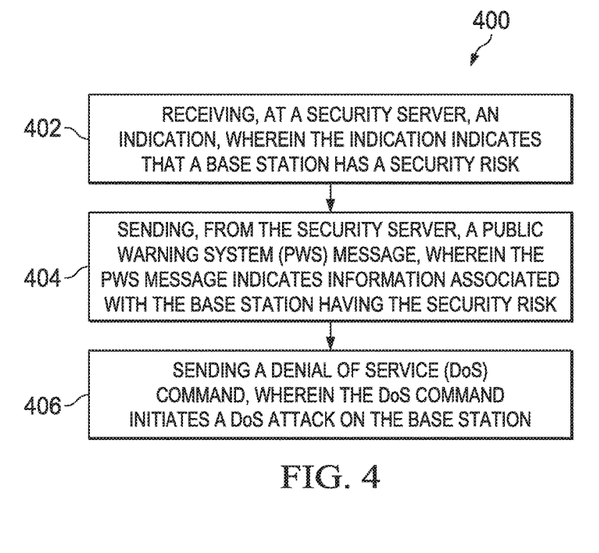
FIG. 4 is a flow diagram showing an example process for responding to a discovery of a base station with a security risk according to an implementation.

The server 108 represents an application, set of applications, software, software modules, hardware, or any combinations thereof that can be configured to assist the detection of base stations with a security risk. In some cases, the server 108 can include a computer. In some cases, the server 108 can be configured to receive a first message from the user device 102 and send a second message to the user device 102 for detecting base stations with a security risk. In some cases, the server 108 can be configured to receive a first message from the security device 122 and send a second message to the security device 122 for detecting base stations with a security risk. FIGS. 2-4 and associated descriptions provide additional details of these implementations.

In some cases, the server 108 can include an enterprise mobility management (EMM) server. The EMM server can manage applications and devices for an enterprise. For example, the EMM server can install, update, and manage the license of enterprise applications for the user device 102 or security device 122. In some cases, the EMM server can configure the user device 102 or security device 122 to send the first message to the EMM server. Alternatively or in combination, the server 108 can include a server that provides services for security applications. For example, a security application can be installed on the user device 102 or security device 122. The security application can configure the first message to be addressed to the server 108 for detecting base stations with a security risk. In some cases, the server 108 can be operated by a network operator, a third party that provides service for security applications, or a combination thereof.

The security server 120 represents an application, set of applications, software, software modules, hardware, or any combinations thereof that can be configured to provide responsive actions if a base station with a security risk is detected. In some cases, the security server 120 can include a computer. In some cases, the security server 120 can be configured to receive an indication that a target base station has a security risk, send warnings to electronic devices, and send a Denial of Service (DoS) command to security devices 122. FIGS. 2-4 and associated descriptions provide additional details of these implementations.

In some cases, the security server 120 can include an enterprise mobility management (EMM) server. Alternatively or in combination, the security server 120 can include a server that provides services for security applications. In some cases, the security server 120 can be operated by a network operator, a third party that provides service for security applications, or any combinations thereof. In some cases, the security server 120 can be located on the same hardware platform as the server 108. Alternatively, the security server 120 and the server 108 can be implemented on different hardware platforms.

The example communication system 100 includes the network 110. The network 110 represents an application, set of applications, software, software modules, hardware, or any combinations thereof that can be configured to provide communications for one or more devices in FIG. 1, e.g., the user device 102, the security device 122, the security server 120, the server 108, or any combinations thereof. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), LTE-Advanced, or Wireless Local Area Network (WLAN). In some instances, the core networks may be evolved packet cores (EPCs).

A RAN is part of a wireless telecommunication system which implements a radio access technology, such as GSM, UMTS, CDMA2000, 3GPP LTE, 3GPP LTE-A, or WLAN. In many applications, a RAN includes at least one base station, e.g., the base station 106. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

In some cases, the base station 106 can be part of the network 110 that is operated by a legitimate network operator. In these or other cases, the base station 106 can send messages received from an electronic device and forward the messages to other nodes in the network 110. The base station 106 can also receive messages addressed to the user device 102, send paging message to the electronic device, and deliver the messages to the user device 102. In some cases, the base station 106 can be a base station having a security risk. For example, the base station 106 can be an imposter base station that is not part of a legitimate network. In these or other cases, the base station 106 may not be able to deliver messages to other nodes in a legitimate network, receive messages addressed to the electronic device from other nodes in a legitimate network, page the electronic device, or any combinations thereof.

The user device 102 is an electronic device that is controlled by a user. The user can use the user device 102 to access the network 110. The user device can be configured to detect a base station with a security risk, display a warning to the user, or a combination thereof. The security device 122 is an electronic device configured to send DoS attacks to a base station with a security risk. The security device 122 can be installed, managed, or operated by a network operator. In some cases, the network operator can position multiple security devices 122 throughout a network. In some cases, the security device 122 can also be configured to detect base stations with security risk, notify the server 108, or a combination thereof. FIGS. 2-4 and associated descriptions provide additional details of these implementations.

In operation, the user device 102 camps on the base station 106. The user device 102 sends a first message to the base station 106. The first message can be addressed to the server 108. The user device 102 determines whether the base station 106 has a security risk based on whether the user device 102 receives a second message in response to the first message. The user device 102 can further evaluate the second message to determine whether the base station 106 has a security risk. In some cases, user device 102 can display a warning notification indicating the detection of a base station having a security risk. In some cases the user device 102 can terminate the connection to the base station having a security risk. FIGS. 2-4 and associated descriptions provide additional details of these implementations.

In another operation, the security device 122 camps on the base station 106. The security device 122 sends a first message to the base station 106. The first message can be addressed to the server 108. The security device 122 determines whether the base station 106 has a security risk based on whether the security device 122 receives a second message in response to the first message. The security device 122 can further evaluate the second message to determine whether the base station 106 has a security risk. In some cases, security device 122 sends a notification message indicating that a base station is discovered to have a security risk. In some cases, the security server 120 sends a warning to user devices 102 in the network 110 indicating the base station that has a security risk. In some cases, the security server 120 sends DoS commands to the security device 122 to launch a DoS attack against the base station having a security risk. In some cases, the security device 122 launches a DoS attack against the base station having a security risk. In some cases, the DoS attack is launched in response to the DoS commands from the security server 120. Alternatively or in combination, the DoS attack is automatically launched in response to determining that the base station has a security risk. FIGS. 2-4 and associated descriptions provide additional details of these implementations.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is a schematic diagram 200 showing an electronic device 202 that detects base stations with a security risk according to an implementation. In some cases, the device 202 can be used to perform the function as the user device 102 or the security device 122 shown in FIG. 1. The electronic device 202 includes a processing unit 262, a communication subsystem 266, a user interface 268, and a memory 264. The electronic device 202 may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. In some cases, the processing unit 262 can also be configured to make a radio resource management (RRM) decision, such as cell selection/reselection information or trigger a measurement report. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 266 can be an advanced receiver or a baseline receiver. Two receivers can be implemented with identical, similar, or different receiver processing algorithms.

The example user interface 268 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone.

The example memory 264 can be a computer-readable storage medium on the electronic device 202. Examples of the memory 264 include volatile and non-volatile memory, magnetic media, optical media, random access memory (RAM), read-only memory (ROM), removable media, and others. The memory 264 can store an operating system (OS) of electronic device 202 and various other computer-executable software programs for performing one or more of the processes, steps, or actions described above.

As shown in FIG. 2, the example memory 264 can include a base station security application 210. The base station security application 210 represents an application, set of applications, software, software modules, hardware, or any combinations thereof that can be configured to detect base stations having a security risk. In some cases, after the electronic device 202 camps on a base station, the base station security application 210 can send a first message addressed to a server, receive a second message from the base station in response to the first message, and evaluate the second message within a time period to determine if the base station has a security risk. In some cases, if the base station is determined to have a security risk, the base station security application 210 can instruct the electronic device 202 to select a different base station to camp on. FIG. 3 and associated descriptions provide additional details of these implementations. In some other cases a notification can be outputted on a display of the electronic device 202. Alternatively or in combination, a notification can be sent to a security server.

In some cases, e.g., if the electronic device 202 is used to perform the function as the security device 122 shown in FIG. 1, the example memory 264 can include a base station blocking application 220. The base station blocking application 220 represents an application, set of applications, software, software modules, hardware, or any combinations thereof that can be configured to launch a Denial of Service (DoS) attack on a target base station. In some cases, the base station blocking application 220 can receive a DoS command from a security server, identify a target base station based on the DoS command, and launch DoS attacks to the target base station. FIG. 4 and associated descriptions provide additional details of these implementations. In some other cases the 220 can launch a DoS attack independent of receiving a DoS command.

Turning to a general description, an electronic device, e.g., the electronic device 202, may include, without limitation, any of the following: computing device, mobile device, mobile electronic device, user device, mobile station, subscriber station, portable electronic device, mobile communications device, wireless modem, or wireless terminal. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 3 is a flow diagram showing an example process 300 for detecting base stations with a security risk according to an implementation. The process 300 can be implemented by an electronic device, e.g., the user device 102 or the security device 122 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, where an electronic device selects a base station to camp on. In some cases, when the electronic device camps on a base station, the electronic device can monitor an overhead channel, e.g., a paging channel, of the base station for paging messages addressed to the electronic device. When the electronic device camps on a base station, the electronic device can also establish a radio connection, e.g., a radio resource control (RRC) connection, with the base station. The electronic device can use the radio connection to send data packets to the base station and receive data packets from the base station.

In some cases, the base station is selected based on one or more radio signal characteristics. In one example, the electronic device can evaluate radio signals from multiple base stations and select the base station that sends the strongest down link signals. Alternatively or in combination, the base station can be selected based on one or more configuration settings. In one example, the electronic device can be configured with a preference of one or more public land mobile networks (PLMNs). Therefore, the electronic device can select a base station from the preferred PLMNs. In another example, the electronic device can be configured with a preference of one or more radio access technologies, e.g., LTE. Therefore, the electronic device can select a base station that operates in the preferred radio access technologies.

From 302, the process 300 proceeds to 304, where the electronic device sends a first message to the base station. In some cases, the first message is addressed to a server. In some cases, the server can be an EMM server that manages the applications for the electronic device. Alternatively or in combination, the server can be a security server that processes the messages for detecting a security risk associated with base stations.

The first message indicates a request for the server to send a second message to the electronic device. In some cases, a request for the server to send a second message can be explicitly included in the first message. Alternatively, the request can be implicitly indicated by the first message. For example, the first message and the second message can be part of a message sequence defined by a message exchange protocol. Therefore, a receipt of the first message can trigger the second message to be sent. The server is configured to send the second message to the electronic device in response to the first message. In one example, the first message can be an SMS message addressed to the server. The server is configured to send a response SMS message addressed to the electronic device. In another example, the first message can be a ping that is sent to the server. The server is configured to send another ping to the electronic device in response.

In some cases, the electronic device can perform a preliminary security evaluation of the base station. If the electronic device determines that the base station may have potential security risks during the preliminary security evaluation, the electronic device can send the first message. If the electronic device determines that the base station may not have potential security risks, the electronic device can determine not to send the first message.

In some cases, the preliminary security evaluation can include a determination of whether encryption is supported. In some cases, some base stations can indicate that encryption is supported by the base stations or other network entities connected to the base stations. In these cases, the base stations are less likely to have a security risk. In these or other cases, the electronic device can determine not to send the first message if the encryption is supported. Alternatively or in combination, the preliminary security evaluation can include a determination of whether authentication is supported. In some cases, a base station that is part of a network that supports authentication may be less likely to have a security risk. In these or other cases, the electronic device can determine not to send the first message if the base station indicates that authentication is supported.

Alternatively or in combination, the preliminary security evaluation can include a determination based on the radio access technology that the base station operates. For example, if a base station operates in a 3G or an LTE radio access technology, the base station may be less likely to have a security risk. If a base station operates in a GSM radio access technology, the base station may be more likely to have a security risk. Therefore, in some cases, the electronic device can determine to send the first message if the base station operates in GSM. The electronic device can determine not to send the first message if base station operates in 3G or in LTE.

Alternatively or in combination, the preliminary security evaluation can include a determination based on a configured list at the electronic device. For example, a white list can include network operators that do not operate base stations without encryption. Therefore, if the base station broadcasts that the base station is operated by a network operator that is included in the white list, yet encryption is not supported, the electronic device can determine that the base station has potential risks and send the first message. In some cases, the list can be configured by a network operator, a system administrator, or a combination thereof.

In some cases, the electronic device can perform the preliminary security evaluation based on information received from the base station. In one example, the base station can broadcast whether encryption is supported, whether authentication is supported, the types of radio access technologies the base station can operate, or a combination thereof using a broadcast channel. Alternatively or in combination, the electronic device can receive the related information from the base station in a unicast channel.

From 304, the process 300 proceeds to 306, where the electronic device determines whether a second message is received from the base station within a threshold time period after the first message is sent. In some cases, e.g., if the base station does not have a security risk, the base station can forward the first message to other nodes in the network. The first message can be delivered to the server. The server can send the second message in response.

If the base station does not have a security risk, e.g., if the base station is part of a network that runs by a legitimate operator, when the electronic device camps on the base station, the electronic device may be registered in a coverage area associated with the network. The coverage area can include the base station. Therefore, the second message can be sent to the base station from other nodes in the network. The base station can deliver the second message to the electronic device. In some cases, the second message can trigger a paging message in the coverage area. The base station can send the paging message to the electronic device. The electronic device can send a paging response message to the base station. The base station and the electronic electronic device can use the paging-paging response exchange to establish a radio connection between the base station and the electronic device. The base station can send the second message to the electronic electronic device using the radio connection. In some cases, the base station and the electronic device may have an ongoing radio connection. In these or other cases, the base station can send the second message to the electronic device using the ongoing radio connection.

In some cases, e.g., if the base station has a security risk, the base station may not be part of a network that is operated by a legitimate network operator. In some cases, the first message that is received by the base station may not be delivered to the server. Because the server has not received the first message, the server may not send a second message.

Therefore, the electronic device may not receive the second message within a threshold time period.

In some cases, the base station that has a security risk, e.g., a base station that uses a man-in-the-middle attack, may be able to deliver the first message to other nodes of the network. In these cases, the server can receive the first message and send the second message. However, because the base station is not part of a network that is operated by a legitimate operator, when the electronic electronic device camps on the base station, the electronic device may not be registered in a coverage area associated with a legitimate network. The second message may not be sent to the base station having the security risk. Therefore, the second message may not trigger a paging message in the base station. In some cases, the second message can trigger a paging message by base stations in a legitimate network. However, because the electronic device camps on the base station with a security risk, the electronic device may not receive the paging messages from other base stations. Therefore, the electronic device that camps on the base station having a security risk may not receive the second message within a threshold time period.

In some cases, the time period can be configured by the user of the electronic device, a system administrator, a manufacturer of the electronic device, a network operator, or a combination thereof. For example, an operating system of the electronic device, or an application operating on the electronic device that detects a base station with a security risk, can set a default threshold time period. The default can be changed based on user inputs. Alternatively or in combination, an EMM server may configure the time period and push the configuration to the electronic device. In some cases, the time period can be configured based on one or more radio characteristics. For example, the time period can be configured based on the average time for an electronic device to camp on the same base station before performing a cell reselection. In one example, the time period can be set to 5 seconds. In some cases, during the time period, an indication can be outputted on the electronic device to indicate an ongoing determination of whether the base station has a security risk.

From 306, the process 300 proceeds to 308, where the electronic device determines that the base station has a security risk based at least in part on whether the second message is received within the threshold time period. In some cases, if the electronic device does not receive the second message within the threshold time period, the electronic device can determine that the base station has a security risk. If electronic device receives the second message within the threshold time period, the electronic device can determine that the base station does not have a security risk.

In some cases, if the electronic device receives the second message within the threshold time period, the electronic device can further determine whether the base station has a security risk based on the content in the second message. In some cases, the server can include a configured content in the second message. The configured content can include an alphanumerical string, a binary sequence, or any other specific content. The electronic device can determine whether the base station has a security risk based on whether the configured content is included in the second message.

In some cases, the server can include a digital signature in the second message. In some cases, the server can generate the digital signature by signing the first message using a private key of the server. In some cases, the server can generate the signature using digital signature generation algorithms. Examples of the digital ligaturing generating algorithms include Rivest-Shamir-Adleman (RSA), Digital Signature Algorithm (DSA), Elliptic Curve Digital Signature Algorithm (ECDSA), and any other digital signature generating algorithms.

In some cases, the electronic device can evaluate the signature in the second message to authenticate that the second message is sent from the server. In some cases, the electronic device evaluates the signature using the first message and a public key of the server. In some cases, the server can include a certificate associated with the public key in the second message. A certificate can be issued by a certificate authority (CA) to certify the ownership of a public key by the named subject of the certificate. The owner of the public key can generate a signature using a private key that corresponds to the certified public key. A receiver of the signature can validate the identity of the owner based on the certified public key and the signature.

In one example, the server can generate a public key-private key pair. The server can send the public key to the CA. The CA can generate a certificate and send the certificate to the server. The certificate can be an explicit certificate or an implicit certificate. The server can generate the signature using the private key in the public-private key pair. The electronic device can obtain the corresponding public key from the certificate included in the second message and use the public key to evaluate the signature included in the second message. In some cases, e.g., if the second message does not include a certificate, the electronic device can obtain the public key of the server.

If the evaluation succeeds, the electronic device can determine that the second message is sent by the server and therefore the base station does not have a security risk. If the evaluation fails, the electronic device can determine that the second message is not sent by the server and the base station has a security risk.

In some cases, in response to determining that the base station has the security risk, the user device can terminate the connection with the base station that has the security risk. In some cases, the user device can also select a different base station to camp on in response to determining that the base station has the security risk. In some cases, the user device can add the base station in a black list. Therefore, the user device can refrain from selecting the base station to camp on in the future.

In some cases, a base station security indication can be outputted at the electronic device. The base station security indication can indicate whether the base station is determined to have a security risk. For example, if the base station is determined to have a security risk, a red button can be outputted on the electronic device. If the base station is determined not to have a security risk, a green button can be outputted on the electronic device. Other examples of the base station security indication can include an icon, a dialogue box, a text, a figure, an alert sound, or any other user interface objects.

In some cases, in response to determining that the base station has a security risk, the electronic device can send a notification message to a security server. The notification message can indicate that the base station has the security risk. In some cases, the notification message can include information associated with the base station. Example of the information can include the cell identification (ID) of the base station, the Media Access Control (MAC) address of the base station the base station identity (ID), the physical location of the base station, or any combinations thereof.

In some cases, a security server can actively respond if a base station having a security risk is discovered. FIG. 4 is a flow diagram showing an example process 400 for responding to a discovery of a base station with a security risk according to an implementation. The process 400 can be implemented by a security server, e.g., the security server 120 shown in FIG. 1. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order.

The example process 400 begins at 402, where a security server receives an indication that a base station has a security risk. In some cases, the indication can be a notification message sent by an electronic device as discussed previously. Alternatively or in combination, the indication can be sent by other nodes in a network in response to a discovery that a base station has a security risk. In some cases, the indication can include information associated with the base station. Example of the information can include the cell identification (ID) of the base station, the Media Access Control (MAC) address of the base station, the base station identity (ID), the physical location of the base station, or any combinations thereof.

From 402, the process 400 proceeds to 404, where the security server sends a public warning system (PWS) message. The PWS message can indicate information associated with the base station having the security risk. Example of the information can include the cell identification (ID) of the base station, the Media Access Control (MAC) address of the base station the base station identity (ID), the physical location of the base station, or any combinations thereof. In some cases, the PWS message can be sent to electronic devices throughout an entire network or a portion of a network. For example, the PWS message can be sent to electronic devices that are camped on base stations in a region overlapping with the coverage area of the discovered base station with a security risk.

From 404, the process 400 proceeds to 406, where the security server sends a denial of service (DoS) command. In some cases, an operator may provision a plurality of security devices throughout the operator's network. In some cases, the DoS command can include information associated with the discovered base station with a security risk. Example of the information can include the cell identification (ID) of the base station, the Media Access Control (MAC) address of the base station the base station identity (ID), the physical location of the base station, or any combinations thereof. The security devices can receive DoS commands, identify the base station with security risk based on the information in the DoS message, and launch DoS attacks to the identified base station.

In some cases, the security devices can be connected to a security server through the network so that the security devices can receive the DoS commands. In some cases a security device can be connected to a secure base station that supports encryption, supports authentication, operates in 3G or LTE, is included in a white list, or any combinations thereof. Alternatively or in combination, the security device can be connected to a security server through a WLAN, a wired network, or a combination thereof. In some cases, a security device can verify that the security device camped on a secure base station using the process discussed in association with FIG. 3.

In some cases, the security devices can launch the DoS attacks by sending multiple messages to a target base station in a short time. Examples of the messages can include access request, attach requests, or any other messages that consume the radio resources, processing resources, or any other resources of the target base station. In some cases, the DoS attacks can prevent the target base station from operating with other electronic devices in the network, and therefore improve the security of the network.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or any combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
    selecting, at an electronic device, a base station to camp on;
    determining, based on information broadcasted by the base station, that the base station does not support encryption;
    in response to determining that the base station does not support encryption based on the information broadcasted by the base station, sending, from the electronic device to the base station, a first message, wherein the first message is addressed to a server, the first message is a short message service (SMS) message or a ping, and requests the server to send a second message to the electronic device;
    determining whether the electronic device receives the second message from the base station within a threshold time period after the first message is sent; and
    determining whether the base station has a security risk based at least in part on whether the second message is received within the threshold time period, wherein the determining whether the base station has the security risk comprises:
        when the electronic device determines that the second message is not received within the threshold time period after the first message is sent, determining that the base station has the security risk; and
        when the electronic device determines that the second message is received within the threshold time period after the first message is sent,
        evaluating a signature included in the second message;
        determining whether the base station has the security risk by determining whether the signature included in the second message is a valid signature provided by the server.

2. The method of claim 1, wherein determining that the base station has the security risk comprises evaluating a content of the second message.

3. The method of claim 1, further comprising in response to determining that the base station has the security risk, outputting an indication at the electronic device.

4. The method of claim 1, further comprising in response to determining that the base station has the security risk, terminating a connection to the base station having the security risk.

5. The method of claim 1, further comprising sending a notification message to a security server, wherein the notification message identifies the base station having the security risk.

6. The method of claim 5, wherein the notification message includes at least one of a cell identification (ID) of the base station or a Media Access Control (MAC) address of the base station.

7. An electronic device, comprising:
a memory; and
at least one hardware processor communicatively coupled with the memory and configured to:
select, at the electronic device, a base station to camp on;
determine, based on information broadcasted by the base station, that the base station does not support encryption;
in response to determining that the base station does not support encryption based on the information broadcasted by the base station, send, from the electronic device to the base station, a first message, wherein the first message is addressed to a server, the first message is a short message service (SMS) message or a ping, and requests the server to send a second message to the electronic device;
determine whether the electronic device receives the second message from the base station within a threshold time period after the first message is sent; and
determine whether the base station has a security risk based at least in part on whether the second message is received within the threshold time period, wherein the determining whether the base station has the security risk comprises:
if the electronic device determines that the second message is not received within the threshold time period after the first message is sent, determining that the base station has the security risk; and
if the electronic device determines that the second message is received within the threshold time period after the first message is sent,
evaluating a signature included in the second message;
determining whether the base station has the security risk by determining whether the signature included in the second message is a valid signature provided by the server.

8. The electronic device of claim 7, wherein determining that the base station has the security risk comprises evaluating a content of the second message.

9. The electronic device of claim 7, wherein the at least one hardware processor is further configured to output an indication at the electronic device in response to determining that the base station has the security risk.

10. The electronic device of claim 7, wherein the at least one hardware processor is further configured to terminate a connection to the base station having the security risk in response to determining that the base station has the security risk.

11. The electronic device of claim 7, wherein the at least one hardware processor is further configured to send a notification message to a security server, wherein the notification message identifies the base station having the security risk.

12. The electronic device of claim 11, wherein the notification message includes at least one of a cell identification (ID) of the base station or a Media Access Control (MAC) address of the base station.

13. A non-transitory computer-readable medium containing instructions which, when executed, cause a computing device to perform operations comprising:
selecting, at an electronic device, a base station to camp on;
determining, based on information broadcasted by the base station, that the base station does not support encryption;
in response to determining that the base station does not support encryption based on the information broadcasted by the base station, sending, from the electronic device to the base station, a first message, wherein the first message is addressed to a server, the first message is a short message service (SMS) message or a ping, and requests the server to send a second message to the electronic device;
determining whether the electronic device receives the second message from the base station within a threshold time period after the first message is sent; and
determining whether the base station has a security risk based at least in part on whether the second message is received within the threshold time period, wherein the determining whether the base station has the security risk comprises:
if the electronic device determines that the second message is not received within the threshold time period after the first message is sent, determining that the base station has the security risk; and
if the electronic device determines that the second message is received within the threshold time period after the first message is sent,
evaluating a signature included in the second message;
determining whether the base station has the security risk by determining whether the signature included in the second message is a valid signature provided by the server.

14. The non-transitory computer-readable medium of claim 13, wherein determining that the base station has the security risk comprises evaluating a content of the second message.

15. The non-transitory computer-readable medium of claim 13, the operations further comprising in response to determining that the base station has the security risk, outputting an indication at the electronic device.

16. The method of claim 1, further comprising: updating the threshold time period based on user input.

17. The electronic device of claim 7, wherein the at least one hardware processor is further configured to: update the threshold time period based on user input.

18. The non-transitory computer-readable medium of claim 13, the operations further comprising: updating the threshold time period based on user input.

* * * * *